US005692724A

United States Patent [19]

Champagne

[11] Patent Number: 5,692,724

[45] Date of Patent: Dec. 2, 1997

[54] METHOD AND APPARATUS FOR ATTENUATING HIGH FREQUENCY VIBRATION SENSITIVITY IN A CONTROL VALVE POSITIONER

[75] Inventor: Raymond P. Champagne, Sterling, Mass.

[73] Assignee: Neles-Jamesbury, Inc., Worcester, Mass.

[21] Appl. No.: 479,191

[22] Filed: Jun. 7, 1995

[51] Int. Cl.[6] .................... F16K 31/10

[52] U.S. Cl. .................... 251/47; 251/54; 91/387; 137/625

[58] Field of Search .................... 251/54, 47; 91/387; 137/625.64

[56] References Cited

U.S. PATENT DOCUMENTS

| | | | |
|---|---|---|---|
| H1292 | 3/1994 | Marsh . | |
| 2,369,731 | 2/1945 | Forsberg | 251/54 |
| 2,579,334 | 12/1951 | Plank | 251/54 |
| 2,593,906 | 4/1952 | Markson | 251/54 |
| 2,957,704 | 10/1960 | Pribonic . | |
| 3,241,569 | 3/1966 | Sully et al. | 251/54 |
| 3,315,701 | 4/1967 | Stilwell | 251/54 |
| 3,367,367 | 2/1968 | Moriyama et al. | 251/54 |
| 3,635,240 | 1/1972 | Vischulis et al. . | |
| 3,794,070 | 2/1974 | Klem et al. . | |
| 3,799,498 | 3/1974 | Wickham et al. . | |
| 4,471,940 | 9/1984 | Zeuner et al. . | |
| 4,531,709 | 7/1985 | Maddalozzo . | |
| 4,545,562 | 10/1985 | Feurgard et al. . | |
| 4,624,508 | 11/1986 | Adachi et al. . | |
| 4,757,980 | 7/1988 | Schubert . | |
| 4,799,645 | 1/1989 | Kramer et al. . | |
| 4,875,501 | 10/1989 | Ichihashi et al. . | |
| 5,311,878 | 5/1994 | Brown et al. . | |
| 5,350,152 | 9/1994 | Hutchison et al. . | |
| 5,366,202 | 11/1994 | Lunzman . | |

FOREIGN PATENT DOCUMENTS

| | | |
|---|---|---|
| 1125292 | 3/1962 | Germany . |
| 1182219 | 12/1964 | Germany . |
| 2333536 | 2/1974 | Germany . |
| 969825 | 9/1964 | United Kingdom . |

*Primary Examiner*—A. Michael Chambers
*Attorney, Agent, or Firm*—Oblon, Spivak, McClelland, Maier & Neustadt, P.C.

[57] ABSTRACT

The invention attenuates higher frequency vibrations or oscillations which can result in wear and/or less than optimal performance of a valve positioner. The invention provides a low pass mechanical filter which can be realized, for example, in a dash pot like damper device. The damper includes a pair of diaphragms associated with a pair of chambers, which are in communication with one another by an orifice. The chambers associated with each diaphragm are filled with oil or a hydraulic fluid such that the rate of relative motion (for example between a summing beam of the positioner and the location at which a signal force is applied) is controlled by flow of oil through the orifice.

40 Claims, 4 Drawing Sheets

METHOD AND APPARATUS FOR ATTENUATING HIGH FREQUENCY VIBRATION SENSITIVITY IN A CONTROL VALVE POSITIONER

BACKGROUND OF THE INVENTION

1. Field of the Invention

The invention provides a damper or low pass mechanical filter which attenuates higher frequency vibrations in a valve system. In particular, the invention provides a dash pot like device for a valve positioner which attenuates higher frequency vibrations while allowing normal positioner action (little or no attenuation) at lower frequencies.

2. Discussion of the Background

A conventional control valve assembly will include a pneumatic or electropneumatic positioner which receives a control signal, and in response, provides a signal to an actuator for controlling valve position. With such an arrangement, vibrations can occur due to external functions such as the pipeline or environment in which the valve is utilized, vibration of the valve or actuator, or undesired high frequency control signal oscillations. Such vibrations are undesirable in that wear of one or more positioner components (or other components of the system) can be accelerated, and performance can be less than optimal.

SUMMARY OF THE INVENTION

Accordingly, it is an object of the present invention to provide a valve control arrangement which attenuates high frequency vibration which can affect positioner performance.

It is a further object of the present invention to provide a low pass mechanical filter which allows normal positioner action (little or no attenuation) at lower frequencies, while attenuating higher frequency vibration which can be caused by external functions, such as pipeline or valve vibration, actuator mechanical vibration, undesired high frequency control signal oscillations, or other sources of vibration/oscillation in the control system.

It is a further object of the invention to provide a low pass mechanical filter or vibration damper which can be implemented in new equipment, or as a retrofit for existing equipment.

The above and other objects and advantages are achieved in accordance with the present invention by providing a damper device or mechanical filter between the location at which the actuator receives a signal from the positioner and the location at which the positioner receives a feedback reaction. In accordance with one example of the present invention, this can be accomplished by replacing a conventional diaphragm of a positioner with a damper assembly which includes a damper housing, a pair of diaphragms, and an orifice plate between the diaphragms. The orifice plate separates the damper housing into two chambers, each of which is filled with an incompressible fluid such as oil or a suitable hydraulic fluid, with the chambers in communication with one another by an orifice disposed in the orifice plate. The size of the orifice is tuned to allow normal control response while attenuating higher frequency motions. For example, with a conventional positioner, operation is based on the principle of summing forces between feedback, a feedback spring, and the signal air (to the actuator diaphragm) via a pivot beam (or summing beam), with the pivot beam controlling the position of a spool of a pilot block. In accordance with the present invention, the relative movement between the pivot beam or summing beam and the location at which the signal air is applied causes oil to flow from one chamber of the damper to the other, with the orifice size determining the rate of relative motion. The invention is applicable to various types of valve arrangements including rotary and linear valves having pneumatic or electropneumatic positioners.

BRIEF DESCRIPTION OF THE DRAWINGS

A more complete appreciation of the invention and many of the attendant advantages thereof will become apparent from the following detailed description, particularly when considered in conjunction with the drawings in which.

DESCRIPTION OF THE PREFERRED EMBODIMENTS

Figure 1A:
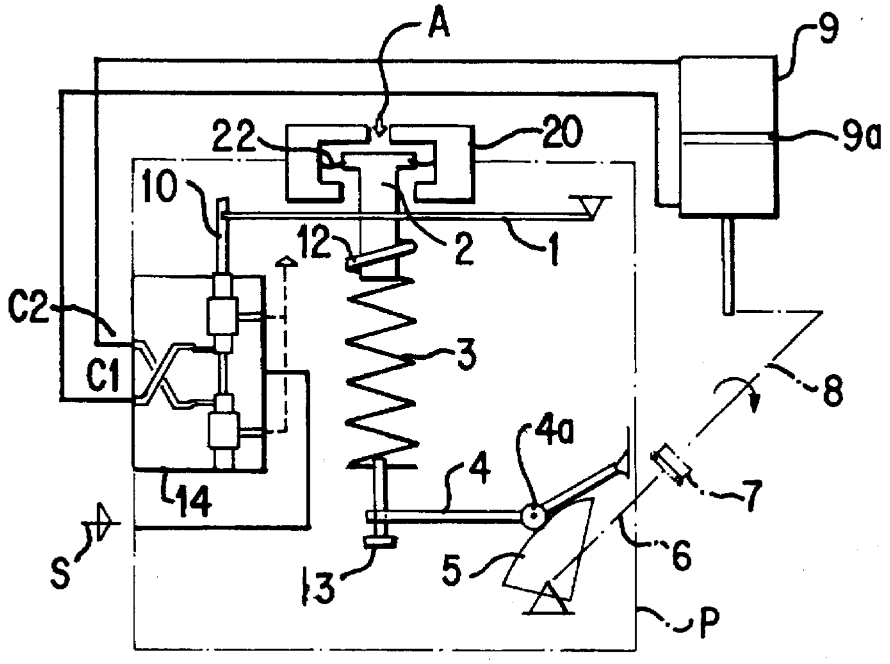
FIG. 1A PRIOR ART
FIGS. 1A and 1B schematically depict conventional positioner and actuator arrangements, with FIG. 1A corresponding to a pneumatic positioner, and FIG. 1B depicting an electropneumatic positioner.
Figure 1B:
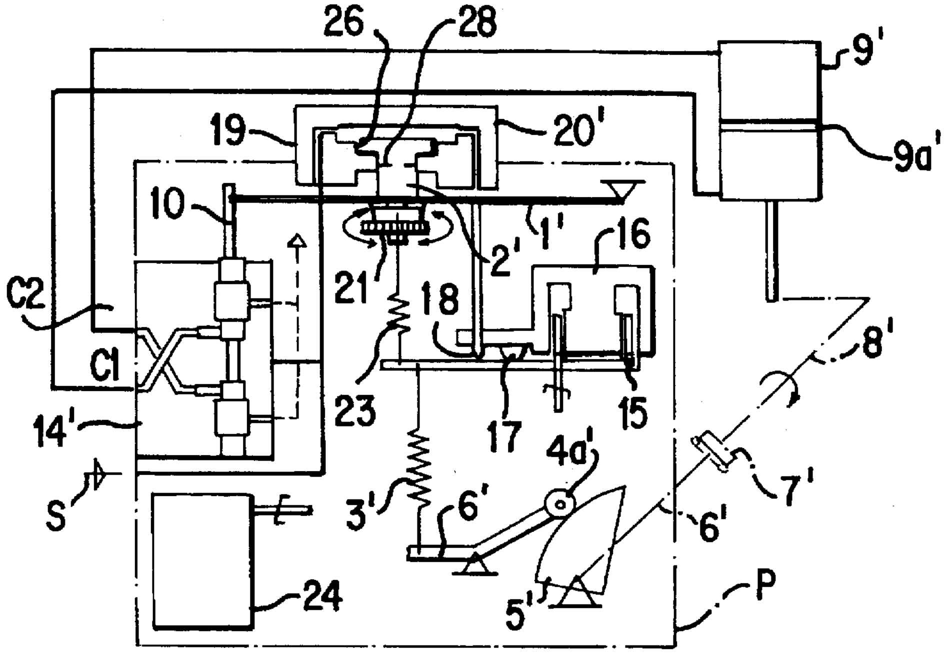
FIG. 1B PRIOR ART

Referring now to the drawings, wherein like reference numerals designate identical or corresponding parts, for background purposes conventional pneumatic and electropneumatic positioner/actuator systems will be described with reference to FIGS. 1A and 1B. In FIGS. 1A and 1B, the positioner portion of the control arrangement is designated generally by the broken line P. FIG. 1A depicts a pneumatic positioner arrangement in which a controller supplies a signal pressure designated by arrow A to a diaphragm assembly 20. The diaphragm assembly 20 includes an elastomeric diaphragm 22 coupled to a diaphragm piston 2, with the diaphragm 22 also sandwiched between a cap of the diaphragm assembly 20 and the remainder of the diaphragm housing. The positioner further includes a pilot block 14 which receives source air indicated by arrow S. The pilot block includes a pair of ports C1, C2 which communicate with an actuator arrangement indicated at 9, such that the pilot block controls the flow of air into and out of the actuator. The actuator includes a piston *9a*, movement of which is effected by the pressure above and below the piston *9a* by virtue of the coupling to the ports C1, C2 of the pilot block 14. Alternatively, only a single pressure coupling of the pilot block to the actuator 9 may be provided, to effect movement of the piston *9a* in a first direction, while return movement is accomplished utilizing a spring within the actuator. The communication of the supply air S with respect to the outlet ports C1, C2 (and thus the air flow or pressure at C1, C2) is controlled by a spool 10, which in turn, is coupled to a summing beam or pivot beam 1. In addition, a feedback spring 3 is provided, and is coupled to a feedback arm or feedback lever 4.

In operation, the signal pressure A received from a controller will move the piston 2 and beam 1, thereby moving the spool 10 to control air flow to or from the actuator 9, thereby moving the piston *9a* and actuator shaft 8 to provide rotary (as shown in FIG. 1A) or linear movement of a valve. A coupling 7 and feedback shaft 6, in turn, move the cam 5 corresponding to movement of the valve or valve stem, such that cam follower 4a moves the feedback arm 4. Movement of the feedback arm 4 correspondingly results in the application of force to the feedback spring 3, with the spring force applied to the beam 1. Element 12 designates a range adjustment nut, while element 13 designates an adjustment screw for adjusting the preload condition of the spring 3.

As should be apparent from the foregoing, the beam 1 thus balances or sums the forces between the signal side and the feedback side of the positioner. Thus, the positioner operates on the principle of summing forces between the feedback, the spring 3, the signal air A input to the diaphragm assembly 20, and the position of the beam 1 resulting from the balancing of these forces in turn determines the position of the spool 10.

FIG. 1B is an electropneumatic positioner arrangement. Rather than providing a pneumatic control signal from the controller (as in FIG. 1A), in the electropneumatic arrangement, an electrical signal is provided to a force coil 15 disposed within a permanent magnet 16, with the force coil connected to a balance beam 17. The diaphragm assembly 20' includes an upper diaphragm 26 and a lower diaphragm 28 coupled to the piston 2' and to the housing of the diaphragm assembly 20'. The source air or supply air S is provided to the pilot block 14', above the upper diaphragm 26, and below the lower diaphragm 28. Movement of the diaphragm piston 2' is determined by the amount of bleeding or leakage which occurs from the nozzle 18, which is in communication with the space above the upper diaphragm, such that a pressure difference above diaphragm 26 and below diaphragm 28 causes movement of the piston 2'. Further, the amount of leakage through the nozzle 18 varies with the position of the balance beam 17, which is controlled by the force coil 15 (responsive to the input signal current). A zero adjustment (or preload adjustment) is provided in the form of a knob 21, while a range adjustment is schematically represented at 24. A feedback spring is provided as shown at 3', with an internal feedback spring represented at 23. Thus, with the electropneumatic arrangement, an electrical input is provided to control position of the balance beam 17 and the leakage through nozzle 18, thus controlling the net force on the diaphragm piston 2'. The summing beam 1' in turn changes the position of the spool 10, varying the air pressures at C1, C2, thus varying the position of the actuator piston 9a' of actuator 9'. In addition, feedback is provided by way of the shaft or stem 8', coupling 7', feedback shaft 6', cam 5', follower 4a', feedback lever 4', springs 3' and 23. Thus, the beam 1' is balanced based upon a summation of the forces acting on the diaphragms of the diaphragm piston 2', and the feedback and spring forces.

In operation of the above systems, vibrations or oscillations can result from the environment in which the valve system is disposed, for example pipe vibration. In addition, vibration of the valve, actuator mechanical vibration, or undesired high frequency control signal oscillations (oscillations of the control air signal or the control current signal) can impart high frequency vibrations or oscillations to the system. As a result, the summing beam and spool 10 vibrate or move rapidly, causing premature wear of the spool 10, or the interface between the spool 10 and the pilot block 14. Further, such vibrations or oscillations can result in less than optimal positioner performance, or can detract from the ability to maintain a precisely desired valve position.

Figure 2:
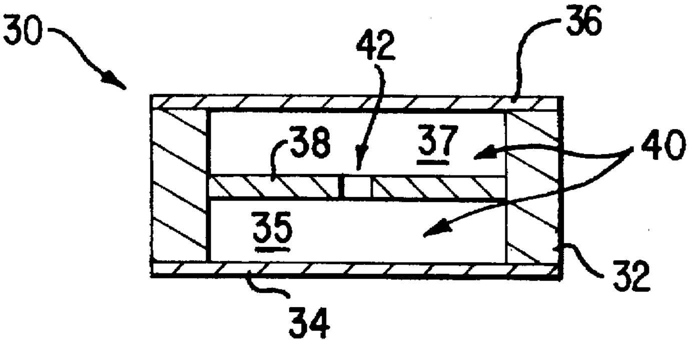
FIG. 2 depicts a damper assembly of the present invention.

Referring now to FIG. 2, a damper arrangement which avoids the aforementioned shortcomings is shown. The damper 3 includes a rigid damper housing 32 which can be formed of a metal such as aluminum, or of a stiff plastic material. In addition, upper and lower diaphragms 34, 36 are provided. The diaphragms 34, 36 are formed of an elastomeric material, and can be formed of the same material as a conventional diaphragm. Although the diaphragms appear substantially flat, they will actually include undulations (as with a conventional diaphragm) to allow movement. A stiff or rigid orifice plate 38 forms a divider within the housing 32 to form first and second chambers 35, 37. Each of the chambers is filled with oil as indicated at 40, and the oil flows from one chamber to the other via an orifice 42 of the orifice plate 38. The size of the orifice determines the relative rate of motion between the location at which the signal air is applied (i.e. in the case of a pneumatic actuator, or the location at which the differential pressure across the diaphragm occurs in the case of an electropneumatic positioner) with respect to the summing beam 1 or 1'. The size of the orifice can be determined empirically, or by analytical or modeling techniques, with the orifice size tuning the damper to allow normal control response of the positioner, while attenuating the amplitude of higher frequency motions. In other words, the size is tuned for a particular application such that little or no attenuating effect occurs as a result of low frequency movement, while the amplitude of higher frequency motions is attenuated.

Figure 3:
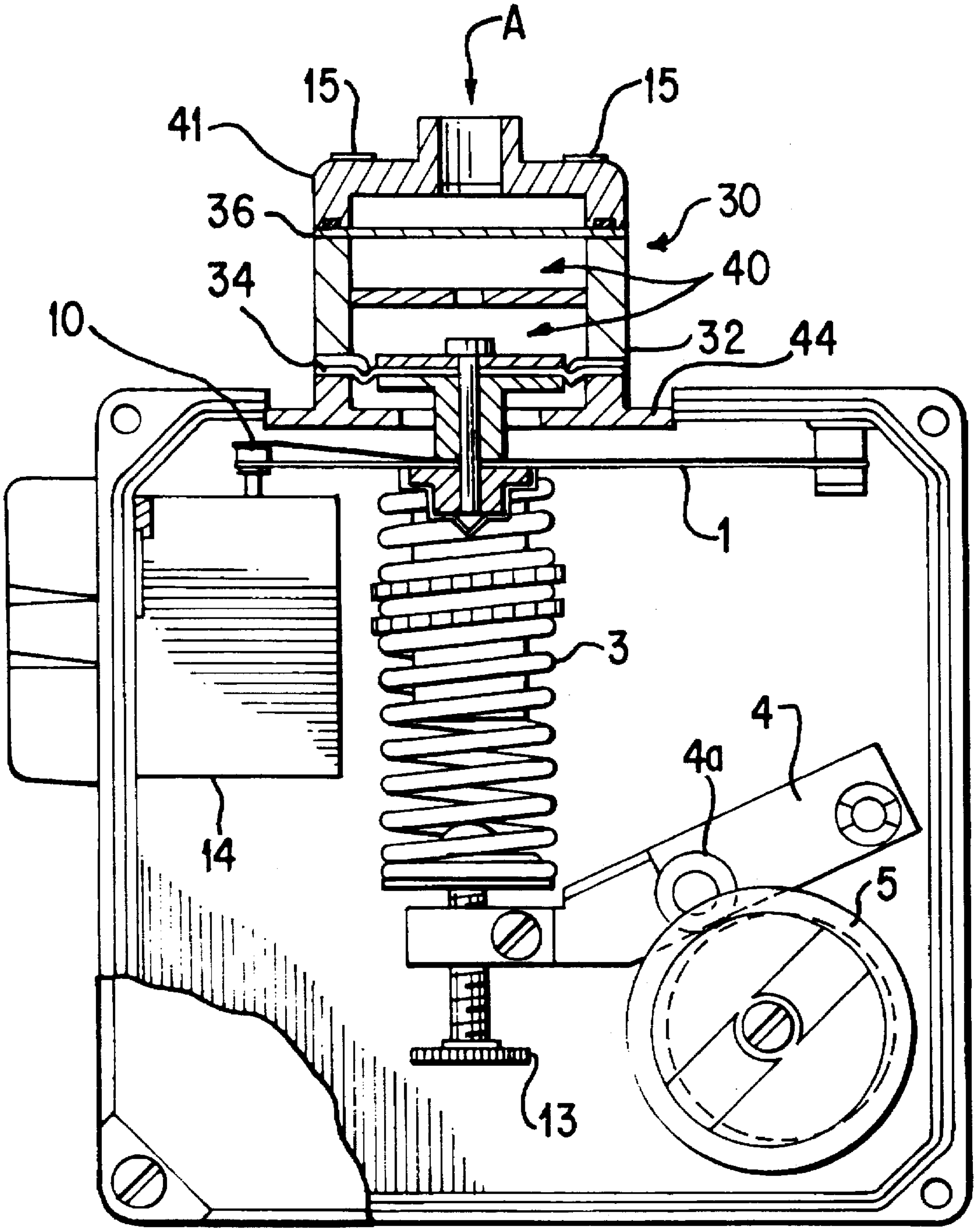
FIG. 3 depicts a pneumatic positioner arrangement including the damper of the present invention.

FIG. 3 depicts a pneumatic positioner assembly including a damper or low pass mechanical filter 30 of the present invention. As discussed with reference to FIG. 1A, the positioner includes a pilot block 14 which controls the flow of air into and out of an actuator (not shown in FIG. 3), with the pilot block 14 controlled by the position of the spool 10, which in turn is controlled by the beam or summing beam 1. Further, a feedback arm 4 is moved about a fixed pivot 4b by the cam follower 4a as it follows along a cam 5 (shown in broken line in FIG. 3). In addition, a feedback spring 3 and zero adjustment screw 13 are also provided. By providing the damper 30 in the location shown in FIG. 3, the damper can conveniently be retrofit on existing positioners, by removing the cap 41 of the diaphragm housing (which in the conventional pneumatic arrangement sandwiches the single diaphragm, with the single diaphragm disposed between the cap 42 and the remainder of the housing 44), inserting the damper 30. Fastening screws 15 extend through the cap 41, through the damper housing 32, and into the remainder of the diaphragm housing or positioner housing 44. It is to be understood however that the present invention is not limited to the positioning of the damper 30 as shown in FIG. 3, and the damper 30 can be disposed at other locations, for example, within the diaphragm housing or an enlarged cap for the diaphragm housing. It is likely also possible to provide a damper on a downstream side of the diaphragm assembly.

Figure 4:
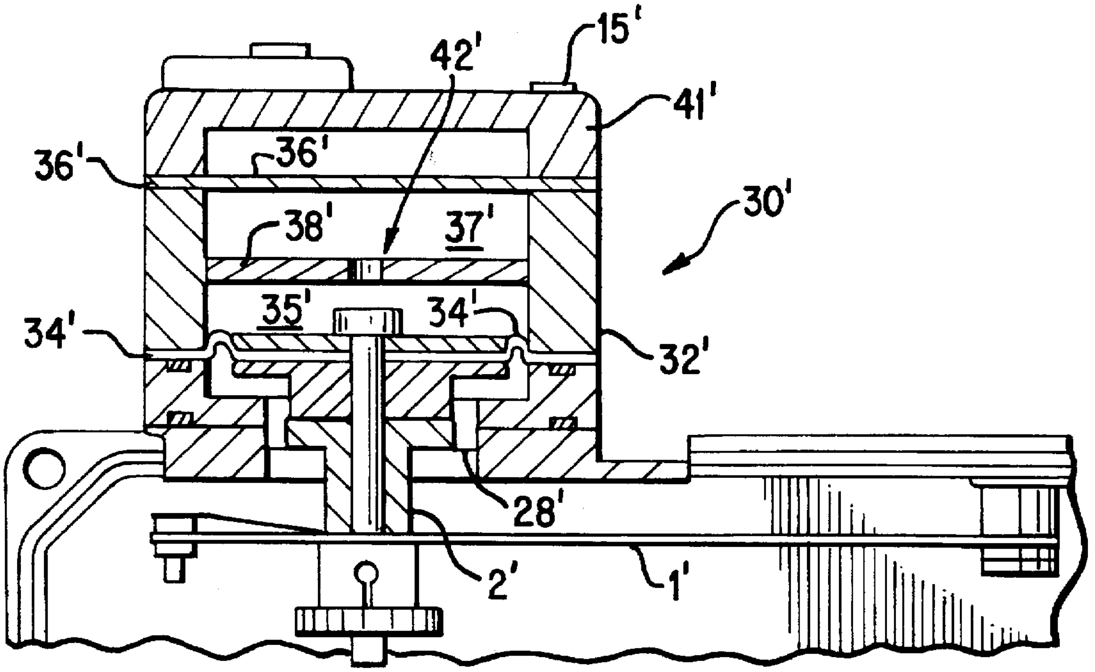
FIG. 4 illustrates the damper of the present invention in an electropneumatic positioner.

FIG. 4 provides an example of the damper device 30' of the present invention in the context of an electropneumatic positioner, with the damper 30' including an upper diaphragm 36', lower diaphragm 34', and an orifice plate 38' separating the two oil filled chambers. As with the pneumatic arrangement, the damper 30' can be installed by removing the cap 41', and inserting the damper 30'. In the electropneumatic arrangement, the lower diaphragm of the damper replaces the upper diaphragm (26 in FIG. 2), and the lower diaphragm 28' is retained. Thus, in the electropneumatic arrangement shown in FIG. 4, a total of three diaphragms are provided (two 34', 36' associated with the damper, and one 28' corresponding to the lower diaphragm of a conventional electropneumatic positioner). Thus, as with the pneumatic arrangement, damping of higher frequency vibrations is provided between the summing beam 1' and the location at which the input signal force is imparted to the diaphragm or diaphragm piston.

Figure 5:
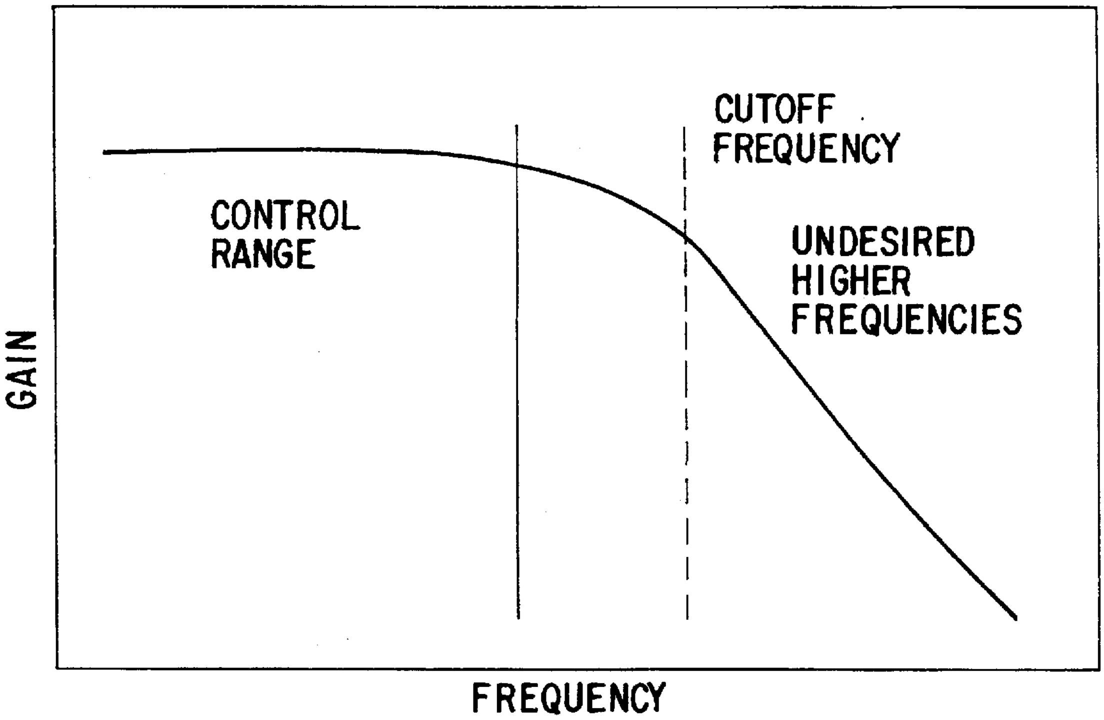
FIG. 5 is a frequency v. gain graph.

FIG. 5 is a gain v. frequency diagram. The broken line represents the cut-off frequency, while the solid line indicates the frequency below which attenuation is not needed. By sizing the orifice within the damper, the damper is tuned to allow normal response (little or no attenuation) for lower frequencies, while attenuating the higher undesired frequencies.

As should be apparent from the foregoing, the present invention reduces undesired vibration or oscillation in a positioner, thus avoiding wear and/or performance deterioration which can result from undesired high frequency vibrations or oscillations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A positioner comprising:
- a pilot block having a spool;
- a summing beam connected to said spool;
- a piston connected to said summing beam;
- means for receiving a signal force to control movement of said piston;
- a feedback connection coupled coupling a feedback to said summing beam; and
- a damper disposed between a location at which the signal force is received and a location at which the feedback enters the positioner.

2. The positioner of claim 1, wherein said damper includes first and second chambers filled with an incompressible fluid and communicating with each other through an orifice.

3. The positioner of claim 2, wherein a first diaphragm is associated with said first chamber and a second diaphragm is associated with said second chamber, and wherein said piston is directly fastened to said second diaphragm.

4. The positioner of claim 2, wherein a first diaphragm is associated with said first chamber and a second diaphragm is associated with said second chamber, and wherein said damper further includes a damper housing within which an orifice plate is nonmovably disposed, and wherein said orifice is disposed in said orifice plate, and further wherein said piston is fastened directly to said second diaphragm.

5. The positioner of claim 4, wherein said damper is connected to a diaphragm housing and a diaphragm housing cap, and wherein said first diaphragm is clamped between said diaphragm housing cap and said damper housing, and said second diaphragm is clamped between said damper housing and said diaphragm housing.

6. The positioner of claim 5, further including means for controlling air pressure adjacent to said first diaphragm.

7. The positioner of claim 5, wherein said positioner is an electropneumatic positioner and further includes a third diaphragm connected to said piston, and wherein said second diaphragm is disposed between said first diaphragm and said third diaphragm.

8. A positioner as recited in claim 2, wherein said damper includes a damper housing, and wherein the positioner further includes a first diaphragm associated with said first chamber and a second diaphragm associated with said second chamber, and further wherein said first diaphragm is clamped between a diaphragm housing cap and said damper housing, and said second diaphragm is clamped between said damper housing and a diaphragm housing, and wherein said piston is directly fastened to said second diaphragm.

9. A positioner as recited in claim 8, further including a third diaphragm fastened to said piston.

10. The positioner of claim 2, further including a diaphragm associated with each of said chambers.

11. The positioner of claim 10, wherein said damper includes a damper housing, said positioner includes a diaphragm housing, and said damper housing is connected to said diaphragm housing.

12. The positioner of claim 10, wherein said positioner is a pneumatic positioner.

13. The positioner of claim 10, wherein said positioner is an electropneumatic positioner.

14. The positioner of claim 1, wherein said damper is connected to said piston.

15. The positioner of claim 14, wherein said piston is movable within a housing, and said damper is connected to said housing.

16. A positioner as recited in claim 1, wherein said damper includes a damper housing, and wherein an orifice plate is nonmovably disposed in said damper housing, and further wherein an orifice extends through said orifice plate to provide an opening between first and second chambers disposed within said damper housing.

17. A positioner as recited in claim 1, wherein said piston is directly fastened to a diaphragm of said damper.

18. A positioner comprising:
- a pilot block having a spool;
- a summing beam connected to said spool;
- a piston movable within a diaphragm housing, said piston coupled to said summing beam at a location outside of said diaphragm housing;
- a damper connected to said diaphragm housing and connected to said piston; and
- feedback means connected to said summing beam.

19. The positioner of claim 18, wherein said damper includes first and second chambers delimited by first and second diaphragms and a plate between said first and second diaphragms, said first and second chambers filled with an incompressible fluid.

20. The positioner of claim 19, further including an orifice providing communication between said first and second chambers.

21. The positioner of claim 20, wherein said orifice is in said plate.

22. The positioner of claim 20, further including means for controlling an air pressure adjacent to said first diaphragm, and wherein said second diaphragm is connected to said piston.

23. The positioner of claim 22, wherein said damper includes a damper housing, and wherein said damper housing is disposed between a cap of the diaphragm housing and a remaining part of the diaphragm housing.

24. A positioner as recited in claim 18, wherein said damper includes a damper housing, and wherein an orifice plate is nonmovably disposed in said damper housing, and further wherein an orifice extends through said orifice plate to provide an opening between first and second chambers disposed within said damper housing.

25. A positioner as recited in claim 18, wherein said piston is directly fastened to a diaphragm of said damper.

26. The positioner of claim 18, wherein said damper includes a damper housing, said damper housing disposed between a cap of said diaphragm housing and a remaining part of said diaphragm housing.

27. The positioner of claim 26, wherein a first diaphragm is disposed on a first side of said damper housing and a second diaphragm is disposed on a second side of said damper housing, and wherein said piston is directly fastened to said second diaphragm.

28. The positioner of claim 27, wherein a signal air pressure is directed onto said first diaphragm.

29. The positioner of claim 27, wherein said positioner is an electropneumatic positioner and further includes a third diaphragm directly fastened to said piston.

30. A positioner comprising:

a pilot block having a spool;

a summing beam coupled to said spool;

a diaphragm assembly including a movable piston, said movable piston coupled to said summing beam, said diaphragm assembly further including a damper;

said damper including first and second chambers and an orifice providing communication between said first and second chambers, said damper further including a first diaphragm and a second diaphragm respectively associated with said first chamber and said second chamber, said second diaphragm coupled to said piston, said first and second chambers including a fluid; and means for controlling air pressure adjacent to said first diaphragm.

31. The positioner of claim 30, wherein said orifice extends through a nonmovable plate separating said first and second chambers.

32. The positioner of claim 30, wherein said diaphragm assembly includes a diaphragm housing and a diaphragm housing cap, said damper further including a damper housing, said damper housing disposed between said diaphragm housing and said diaphragm housing cap.

33. The positioner of claim 30, wherein said diaphragm assembly includes a diaphragm housing, said damper including a damper housing connected to said diaphragm housing.

34. The positioner of claim 30, wherein said positioner is a pneumatic positioner.

35. The positioner of claim 30, wherein said positioner is an electropneumatic positioner.

36. The positioner of claim 15, wherein said piston is directly fastened to said second diaphragm.

37. The positioner of claim 36, wherein said piston is directly fastened to a third diaphragm.

38. The positioner of claim 15, wherein said damper includes a damper housing, and wherein said diaphragm assembly includes a diaphragm housing having a diaphragm housing cap, and wherein said damper housing is disposed between said diaphragm housing cap and a remainder of said diaphragm housing.

39. The positioner of claim 38, wherein said first diaphragm is clamped between said diaphragm housing cap and said damper housing, and wherein said second diaphragm is clamped between said damper housing and said remainder of said diaphragm housing.

40. The positioner of claim 39, wherein a third diaphragm is fastened directly to said piston.

* * * * *